United States Patent
Winterling et al.

(10) Patent No.: US 6,958,381 B2
(45) Date of Patent: *Oct. 25, 2005

(54) POLYAMIDE

(75) Inventors: Helmut Winterling, Ludwigshafen (DE); Michael Fischer, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 139 days.

This patent is subject to a terminal disclaimer.

(21) Appl. No.: 10/416,466

(22) PCT Filed: Nov. 22, 2001

(86) PCT No.: PCT/EP01/13595

§ 371 (c)(1),
(2), (4) Date: May 12, 2003

(87) PCT Pub. No.: WO02/42357

PCT Pub. Date: May 30, 2002

(65) Prior Publication Data

US 2004/0102600 A1 May 27, 2004

(30) Foreign Application Priority Data

Nov. 23, 2000 (DE) .......................................... 100 58 292

(51) Int. Cl.$^7$ .............................................. C08G 69/08

(52) U.S. Cl. ...................... 528/322; 528/170; 528/310; 528/312; 528/323; 528/332; 528/335; 528/336

(58) Field of Search ................................ 528/170, 310, 528/312, 322, 323, 332, 335, 336

(56) References Cited

U.S. PATENT DOCUMENTS

| | | | | | |
|---|---|---|---|---|---|
| 4,543,407 | A | * | 9/1985 | Curatolo et al. | 528/336 |
| 4,734,487 | A | * | 3/1988 | Curatolo et al. | 528/336 |
| 5,185,427 | A | * | 2/1993 | Marks | 528/329.1 |
| 5,807,972 | A | | 9/1998 | Liedloff et al. | |
| 6,201,096 | B1 | * | 3/2001 | Marchildon et al. | 528/310 |
| 6,686,465 | B2 | * | 2/2004 | Ohlbach et al. | 540/539 |
| 6,699,960 | B1 | * | 3/2004 | Ohlbach et al. | 528/310 |
| 6,750,318 | B2 | * | 6/2004 | Tanaka et al. | 528/310 |
| 6,774,205 | B2 | * | 8/2004 | Bever et al. | 528/310 |

FOREIGN PATENT DOCUMENTS

WO    99/46323    9/1999

* cited by examiner

Primary Examiner—P. Hampton Hightower
(74) Attorney, Agent, or Firm—Novak Druce & Quigg, LLP

(57) ABSTRACT

A process for preparing polyamides comprises polymerizing starting monomers in the presence of from 2.3 to 10 mmol, based on 1 mol of carboxamide group of the polyamide, of a chain regulator containing a nitrile group and a functional group capable of forming a carboxamide group.

20 Claims, 2 Drawing Sheets

POLYAMIDE

Figure 1:
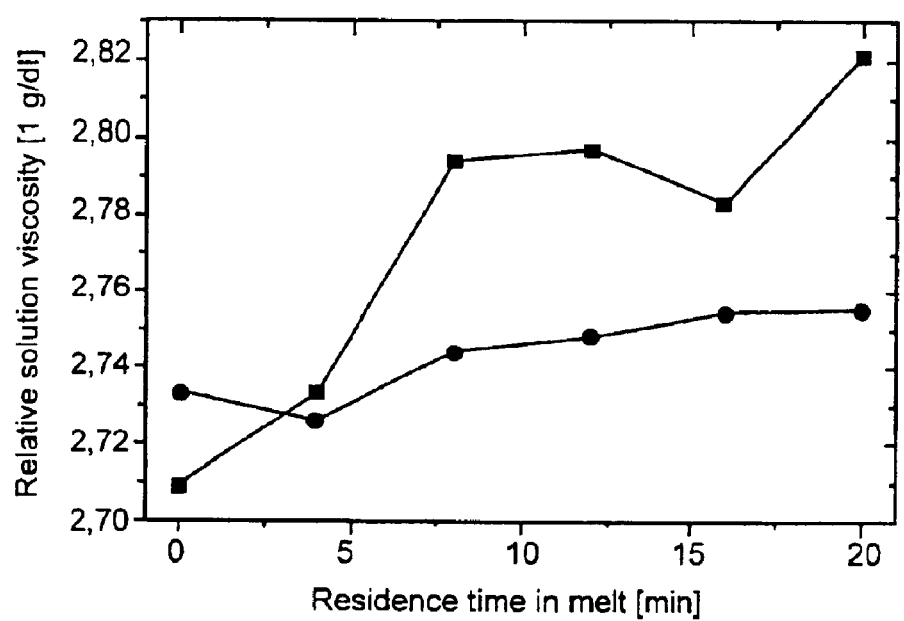

The present invention relates to a process for preparing polyamides, which comprises polymerizing starting monomers in the presence of from 2.3 to 10 mmol, based on 1 mol of carboxamide group of the polyamide, of a chain regulator containing a nitrile group and a functional group capable of forming a carboxamide group.

The present invention further relates to a polyamide obtainable, especially obtained, by this process, to polyamide containing, chemically bonded to the polymer chain via a carboxamide group, in an amount in the range from 2.3 to 10 mmol, based on 1 mol of carboxamide groups of the polyamide, a compound containing a nitrile group and a functional group capable of forming a carboxamide group, and to filament, fiber, sheet or molding comprising, specifically consisting of, such polyamide.

Polyamides are industrially important thermoplastic polymers which are customarily processed in the molten state, for example by extrusion or injection molding, into filament, fiber, sheet or molding.

To be properly processible in the molten state, the polymer has to possess high melt stability. Changes in the polymer due to thermal stress in the molten state are customarily determined according to the standard DIN EN ISO 1133 as a viscosity change of the melt. Such viscosity changes of the melt may be indicative not only of polymer degradation but also of postcondensation.

In addition, the filament, fiber, film and sheet obtainable from such polymers should possess high resistance to thermal stresses below the melting point. This is customarily measured via the notched impact strength after hot aging as defined in the standard DIN EN ISO 179.

To stabilize the polyamide with regard to a melt viscosity change and also with regard to a thermal stress below the melting point of products produced from such polyamides, it is customary to add chain regulators, for example propionic acid, before or during the polymerization from the starting monomers, and a further improvement in this stabilization is desirable.

It is an object of the present invention to provide polyamides having improved melt stability and improved impact toughness after heat treatment and also a process for producing such polyamides.

We have found that these objects are achieved by the polyamides defined at the outset, processes for producing such polyamides and filament, fiber, sheet and moldings containing such polyamide, especially consisting of such a polyamide.

Polyamides are herein to be understood as being homopolymers, copolymers, blends and grafts of synthetic long-chain polyamides having recurring amide groups in the polymer main chain as an essential constituent. Examples of such polyamides are nylon-6 (polycaprolactam), nylon-6,6 (polyhexamethyleneadipamide), nylon-4,6 (polytetramethyleneadipamide), nylon-6,10 (polyhexamethylenesebacamide), nylon-7 (polyenantholactam), nylon-11 (polyundecanolactaim), nylon-12 (polydodecanolactam). As well as polyamides known by the generic name of nylon, polyamides further include the aramids (aromatic polyamides), such as poly-meta-phenyleneisophthalamide (NOMEX® fiber, U.S. Pat. No. 3,287,324) or poly-para-phenyleneterephthalamide (KEVLAR® fiber, U.S. Pat. No. 3,671,542).

Polyamides can in principle be prepared by two methods.

In a polymerization from dicarboxylic acids and diamines and also in a polymerization from amino acids or their derivatives, such as aminocarbonitriles, aminocarboxamides, aminocarboxylate esters or aminocarboxylate salts, the amino and carboxyl end groups react with one another to form an amide group and water. The water can subsequently be removed from the polymer. In a polymerization from carboxamides, the amino and amide end groups of the starting monomers or starting oligomers react with one another to form an amide group and ammonia. The ammonia can subsequently be removed from the polymer. This polymerization reaction is customarily known as a polycondensation.

A polymerization from lactams as starting monomers or starting oligomers is customarily known as a polyaddition.

Starting monomers may be compounds selected from the group consisting of lactams, omega-aminocarboxylic acids, omega-aminocarboxamides, omega-aminocarboxylate salts, omega-aminocarboxylate esters, equimolar mixtures of diamines and dicarboxylic acids, dicarboxylic acid/diamine salts or mixtures thereof.

Useful monomers include monomers or oligomers of a $C_2$ to $C_{20}$, preferably $C_2$ to $C_{18}$, arylaliphatic or, preferably, aliphatic lactam such as enantholactam, undecanolactam, dodecanolactam or caprolactam, in particular caprolactam, monomers or oligomers of $C_2$ to $C_{20}$, preferably $C_3$ to $C_{18}$, aminocarboxylic acids such as 6-aminohexanoic acid or 11-aminoundecanoic acid, and dimers, trimers, tetramers, pentamers or hexamers thereof, and salts thereof such as alkali metal salts, for example lithium, sodium or potassium salts, monomers or oligomers of $C_2$ to $C_{20}$ amino acid amides such as 6-aminohexanamide or 11-aminoundecanamide, and dimers, trimers, tetramers, pentamers or hexamers thereof, esters, preferably $C_1$–$C_4$ alkyl esters, such as methyl, ethyl, n-propyl, i-propyl, n-butyl, i-butyl or s-butyl esters, of $C_2$ to $C_{20}$, preferably $C_3$ to $C_{18}$, aminocarboxylic acids, such as 6-aminohexanoic acid esters, for example methyl 6-aminohexanoate, or 11-aminoundecanoic acid esters, for example methyl 11-aminoundecanoate, monomers or oligomers of a $C_2$ to $C_{20}$, preferably $C_2$ to $C_{12}$, alkyldiamine, such as tetramethylenediamine or, preferably, hexamethylenediamine, with a $C_2$ to $C_{20}$, preferably $C_2$ to $C_{14}$, aliphatic dicarboxylic acid such as sebacic acid, dodecanedioic acid or adipic acid, and dimers, trimers, tetramers, pentamers or hexamers thereof, monomers or oligomers of a $C_2$ to $C_{20}$, preferably $C_2$ to $C_{12}$, alkyldiamine, such as tetramethylenediamine or, preferably, hexamethylenediamine, with a $C_8$ to $C_{20}$, preferably $C_8$ to $C_{12}$, aromatic dicarboxylic acid or derivatives thereof, for example chlorides, such as naphthalene-2,6-dicarboxylic acid, preferably isophthalic acid or terephthalic acid, and dimers, trimers, tetramers, pentamers or hexamers thereof, monomers or oligomers of a° $C_2$ to $C_{20}$, preferably $C_2$ to $C_{12}$, alkyldiamine, such as tetramethylenediamine or, preferably, hexamethylenediamine, with a $C_9$ to $C_{20}$, preferably $C_9$ to $C_{18}$, arylaliphatic dicarboxylic acid or derivatives thereof, for example chlorides, such as o-, m- or p-phenylenediacetic acid, and dimers, trimers, tetramers, pentamers or hexamers thereof, monomers or oligomers of a $C_6$ to $C_{20}$, preferably $C_6$ to $C_{10}$, aromatic diamine, such as m- or p-phenylenediamine, with a $C_2$ to $C_{20}$, preferably $C_2$ to $C_{14}$, aliphatic dicarboxylic acid such as sebacic acid, dodecanedioic acid or adipic acid, and dimers, trimers, tetramers, pentamers or hexamers thereof, monomers or oligomers of a $C_6$ to $C_{20}$, preferably $C_6$ to $C_{10}$, aromatic diamine, such as m- or p-phenylenediamine, with a $C_8$ to $C_{20}$, preferably $C_8$ to $C_{12}$, aromatic dicarboxylic acid or derivatives thereof, for example chlorides, such as naphthalene-2,6-dicarboxylic acid, preferably isophthalic acid or terephthalic acid, and dimers, trimers, tetramers, pentamers or hexamers thereof, monomers or oligomers of a $C_6$ to $C_{20}$, preferably $C_6$ to $C_{10}$, aromatic diamine, such as m- or p-phenylenediamine, with a $C_9$ to $C_{20}$, preferably $C_9$ to $C_{18}$, arylaliphatic dicarboxylic acid or derivatives thereof, for example chlorides, such as o-, m- or p-phenylenediacetic acid, and dimers, trimers, tetramers, pentamers or hexamers thereof, monomers or oligomers of a $C_7$ to $C_{20}$, preferably $C_8$ to $C_{18}$, arylaliphatic diamine, such as m- or p-xylylenediamine, with a $C_2$ to $C_{20}$, preferably $C_2$ to $C_{14}$, aliphatic dicarboxylic acid such as sebacic acid, dodecanedioic acid or adipic acid, and dimers, trimers, tetramers, pentamers or hexamers thereof, monomers or oligomets of a $C_7$ to $C_{20}$, preferably $C_8$ to $C_{18}$, arylaliphatic diamine, such as m- or p-xylylenediamine, with a $C_6$ to $C_{20}$, preferably $C_6$ to $C_{10}$, aromatic dicarboxylic acid or derivatives thereof, for example chlorides, such as naphthalene-2,6-dicarboxylic acid, preferably isophthalic acid or terephthalic acid, and dimers, trimers, tetramers, pentamers or hexamers thereof, monomers or oligomers of a $C_7$ to $C_{20}$, preferably $C_8$ to $C_{18}$, arylaliphatic diamine, such as m- or p-xylylenediamine, with a $C_9$ to $C_{20}$, preferably $C_9$ to $C_{18}$, arylaliphatic dicarboxylic acid or derivatives thereof, for example chlorides, such as o-, m- or p-phenylenediacetic acid, and dimers, trimers, tetramers, pentamers or hexamers thereof, and homopolymers, copolymers, mixtures and grafts of such starting monomers or starting oligomers.

Particular preference is given to those starting monomers or oligomers which on polymerization lead to the polyamides nylon-6, nylon-6,6, nylon-4,6, nylon-6,10, nylon-7, nylon-11 or nylon-12 or the aramids poly-meta-phenyleneisophthalamide or poly-para-phenyleneterephthalamide, especially to nylon 6 or nylon 66, such as caprolactam, adipic acid and hexamethylenediamine.

Lactams are obtainable by reacting a cyclic ketone with hydroxylamine to form the corresponding oxime and a subsequent Beckmann rearrangement or from the corresponding aminonitriles by hydrolytic cyclization before or during the polymerization, especially in the presence of catalysts, such as titanium dioxide, in a conventional manner.

The production of omega-aminocarboxylic acids, omega-aminocarboxamides, omega-aminocarboxylate salts and omega-aminocarboxylate esters is known per se. They are obtainable for example from the corresponding aminonitriles before or during the polymerization.

The preparation of dicarboxylic acids is known per se. They are obtainable for example from the corresponding dinitriles before or during the polymerization.

Diamines may be prepared in a conventional manner, as by hydrogenation of the corresponding dinitriles.

According to the invention, the polymerization of starting monomers is effected in the presence of a chain regulator compound containing a nitrile group and a functional group capable of forming a carboxamide group.

It is also possible to use mixtures of such compounds.

In a preferred embodiment, the functional group capable of forming a carboxamide group is an amine group.

It is advantageous to use aromatic, arylaliphatic, preferably aliphatic, aminonitriles, especially aliphatic alpha,omega-aminonitriles having from 2 to 20, preferably from 2 to 12, carbon atoms. Particular preference is given to those aminonitriles whose carbon skeleton corresponds to a starting monomer of the polyamide according to the invention, preferably 6-aminocapronitrile for the preparation of nylon 6 or nylon 66, especially nylon 6.

Such aminonitriles may be prepared in a conventional manner, as by partial hydrogenation of the corresponding dinitriles.

In a preferred embodiment, the functional group capable of forming a carboxamide group is an acid group.

It is advantageous to use aromatic, arylaliphatic, preferably aliphatic, nitrilocarboxylic acids, especially aliphatic alpha,omega-nitrilocarboxylic acids having from 2 to 20, preferably from 2 to 12, carbon atoms. Particular preference is given to those nitrilocarboxylic acids whose carbon skeleton corresponds to a starting monomer of the polyamide according to the invention, preferably 6-nitriloadipic acid for the preparation of nylon 6 or nylon 66, especially nylon 66.

Such nitrilocarboxylic acids may be prepared in a conventional manner, as by partial hydrolysis of the corresponding dinitriles.

According to the invention, the polymerization of starting monomers is carried out in the presence of at least 2.3 mmol, preferably at least 2.4 mmol, especially at least 2.8 mmol, particularly preferably at least 3 mmol, based on 1 mol of carboxamide group of the polyamide, of a chain regulator containing a nitrile group and a functional group capable of forming a carboxamide group.

According to the invention, the polymerization of starting monomers is carried out in the presence of at most 10 mmol, preferably at most 6 mmol, especially at most 4 mmol, based on 1 mol of carboxamide group of the polyamide, of a chain regulator containing a nitrile group and a functional group capable of forming a carboxamide group.

On using the compound which contains a nitrile group and a functional group capable of forming a carboxamide group in smaller amounts, the polyamide is observed not to be sufficiently stable. On using the compound which contains a nitrile group and a functional group capable of forming a carboxamide group in larger amounts, the degree of polymerization is found to be inadequate.

The compound which contains a nitrile group and a functional group capable of forming a carboxamide group and which is used according to the invention as a chain regulator can be used in combination with conventional chain regulators, for example monocarboxylic acids, preferably $C_1$–$C_{10}$-alkanemonocarboxylic acids, such as acetic acid or propionic acid, preferably $C_5$–$C_8$- cycloalkanemonocarboxylic acids, such as cyclopentanecarboxylic acid, cyclohexanecarboxylic acid, preferably benzene- and naphthalenemonocarboxylic acids, such as benzoic acid, naphthalenedicarboxylic acid, for example dicarboxylic acids, preferably $C_2$–$C_{10}$-alkanedicarboxylic acids, such as adipic acid, azelaic acid, sebacic acid or decanedicarboxylic acid, preferably $C_5$–$C_8$-cycloalkanedicarboxylic acids, such as 1,4-cyclohexanecarboxylic acid, preferably benzene- and naphthalenedicarboxylic acids, such as isophthalic acid, terephthalic acid, 2,6-naphthalenedicarboxylic acid, for example monoamines, preferably $C_1$–$C_{10}$-alkanemonoamines, preferably $C_5$–$C_8$-cycloalkanemonoamines, such as cyclopentaneamine, cyclohexaneamine, 4-amino-2,2,6,6-tetramethylpiperidine, for example benzene- and naphthalenemonoamine, such as aniline, naphthaleneamine, for example diamines, preferably $C_2$–$C_{10}$-alkanediamines, such as hexamethylenediamine, preferably $C_5$–$C_8$-cycloalkanediamines, such as 1,4-cyclohexanediamine, preferably benzene-, naphthalene- and xylylidenediamines, such as o-xylylydenediamine, m-xylylydenediamine, p-xylylidenediamine, or mixtures thereof.

The sum total of compound used according to the invention, which contains a nitrile group and a functional group capable of forming a carboxamide group, and the conventional chain regulator should advantageously not exceed the maximum amount defined for the compound used according to the invention, which contains a nitrile group and a functional group capable of forming a carboxamide group, since otherwise the degree of polymerization obtained is insufficient.

In another preferred embodiment, the polymerization or polycondensation in the process of the invention is carried out in the presence of at least one pigment. Preferred pigments are titanium dioxide, preferably titanium dioxide in the anatase form, or coloring compounds inorganic or organic in nature. The pigments are preferably added in an amount of from 0 to 5 parts by weight, especially from 0.02 to 2 parts by weight, based on 100 parts by weight of polyamide. The pigments may be added to the reactor together with the starting materials or separately therefrom.

The polyamides of this invention may be prepared in a manner known per se for polyamides. For example, a polyamide based on a caprolactam may be prepared in the presence of a compound containing a nitrile group and a functional group capable of forming a carboxamide group by the continuous or batch processes described in DE-A 14 95 198, DE-A 25 58 480, DE-A 44 13 177, Polymerization Processes, Interscience, New York, 1977, p. 424–467 and Handbuch der Technischen Polymerchemie, VCH Verlagsgesellschaft, Weinheim, 1993, p. 546–554. The preparation of a polyamide based on adipic acid/hexamethylenediamine in the presence of a compound containing a nitrile group and a functional group capable of forming a carboxamide group may be effected for example in a conventional batchwise process as described for example in Polymerisation Processes, Interscience, New York, 1977, pages 424–467, especially pages 444–446, or in a continuous process, for example as described in EP 129 196. The addition of a compound containing a nitrile group and a functional group capable of forming a carboxamide group to the reactor can take place separately or mixed with all or some of the starting monomers.

The polyamides of this invention can be used to produce filament, fiber, sheet or moldings.

In the case of filament and fiber, preference is given to those which are based on nylon 6 or nylon 66, especially nylon 6, and were obtained by high speed spinning, i.e., by takeoff speeds of more than 4000 m/min.

Prior to the production of sheetlike or three-dimensional articles, the polyamide of this invention may be admixed with conventional additives, such as flame retardants, glass fibers, in a conventional manner, as by extrusion.

EXAMPLES

Inventive Example 1

In an autoclave, 3000 g (26.5 mol) of caprolactam, 450 g of completely ion-free water and 7.3 g (65 mmol) of 6-aminocapronitrile were heated under nitrogen to an internal temperature of 270° C., immediately thereafter let down to atmospheric over an hour and supplementarily condensed for 15 min and discharged.

The discharged polyamide was pelletized, extracted with boiling water to remove caprolactam and oligomers, subsequently dried in a vacuum drying cabinet. The dried extracted pellets were conditioned at 160° C. in the solid phase for 25 h.

Thereafter, the relative solution viscosity of the polyamide was measured in 96% sulfuric acid. For this, 1 g of polymer was weighed out per 100 ml of solution and the flow time was measured in an Ubbelohde viscometer against the pure solvent. Complete incorporation of the nitrile groups was verified by IR spectroscopy.

The relative solution viscosity RV(1.0 g/dl) was 2.73.

Comparative Example 1

Inventive example 1 was repeated except that 4.8 g (65 mmol) of propionic acid were used instead of 7.3 g of 6-aminocapronitrile.

The relative solution viscosity RV(1.0 g/dl) was 2.71.

Example 2

The polymer prepared as per inventive example 1 and comparative example 1 were examined with regard to their flow characteristics as per ISO 1133.

For this, molten polymer was maintained in a heated cylinder at 275° C. for 4, 8, 12, 16, 20 min and subsequently expressed through a die into the open under a force of 5 kg.

The strands obtained in this way were measured for their relative solution viscosity as per inventive example 1. FIG. 1 shows the result.

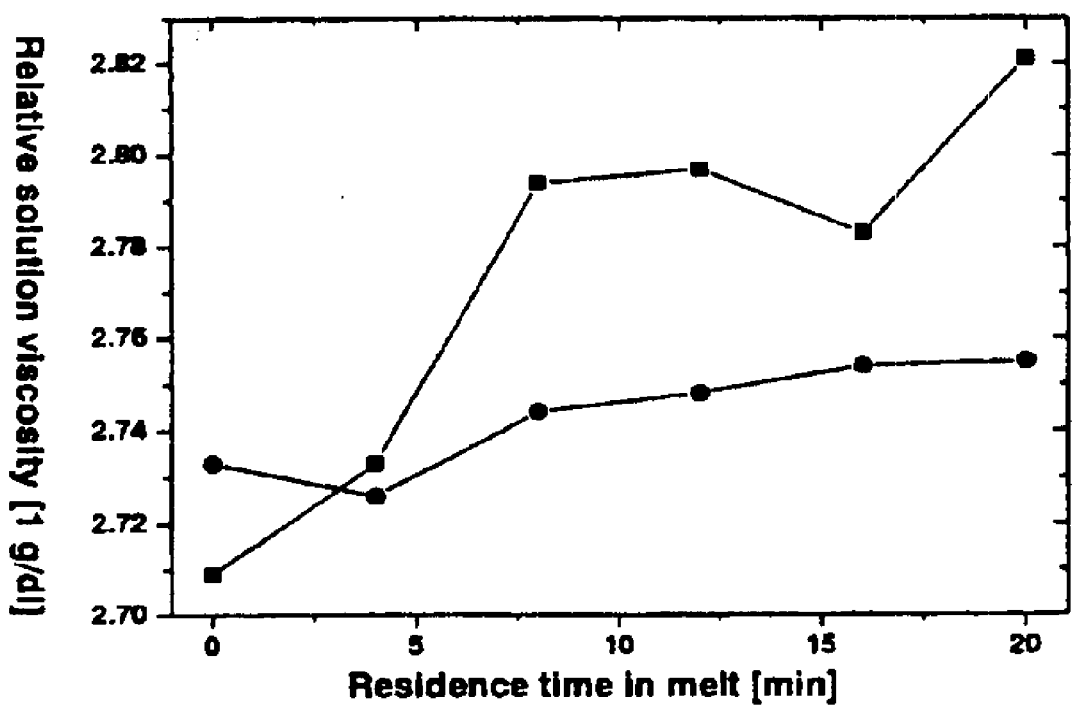

It is clear from FIG. 1 that the polymer of comparative example 1 exhibits a substantial change in solution viscosity, whereas the solution viscosity of the polymer of inventive example 1 remains virtually constant.

A change in solution viscosity is evidence of degradation or of molecular weight increase in the melt prior to expression from the cylinder. The higher the solution viscosity of the extruded strand, the higher the molecular weight increase. This has adverse effects on the processing characteristics.

Example 3

The polymers prepared as per inventive example 1 and comparative example 1 had 30% of glass fibers incorporated into them and were subjected to hot aging in a through circulation oven at 140° C. After aging, the Charpy impact strength was determined according to ISO 179/1eU (measurement at 23° C.). The result is illustrated in FIG. 2.

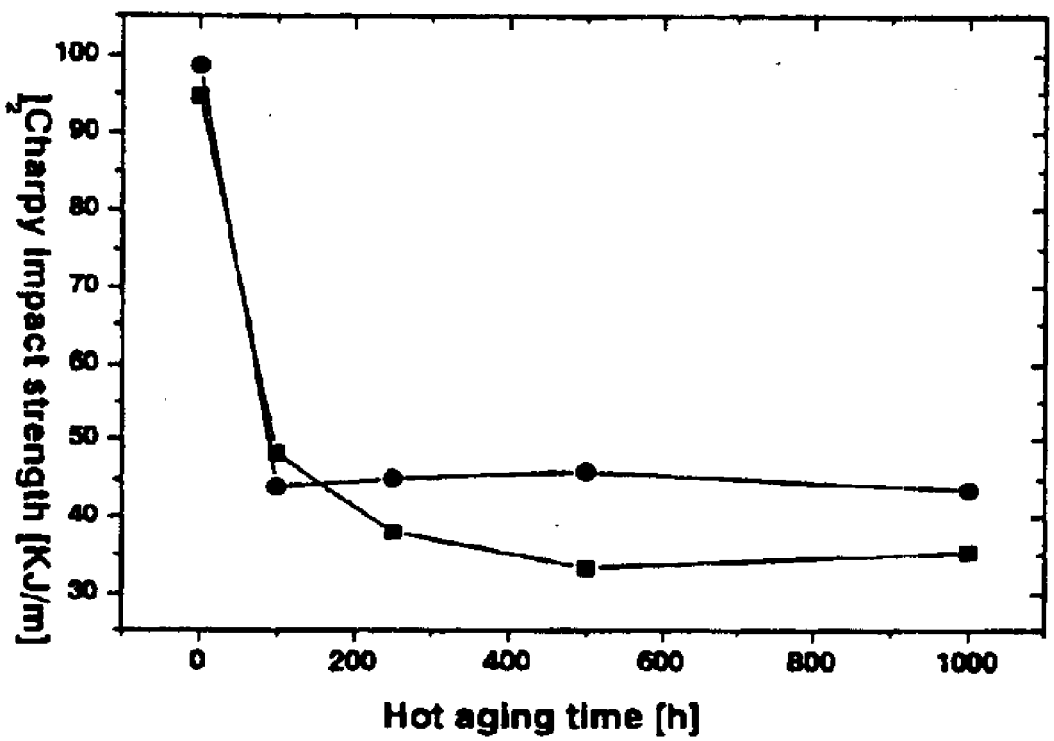

Figure 2:
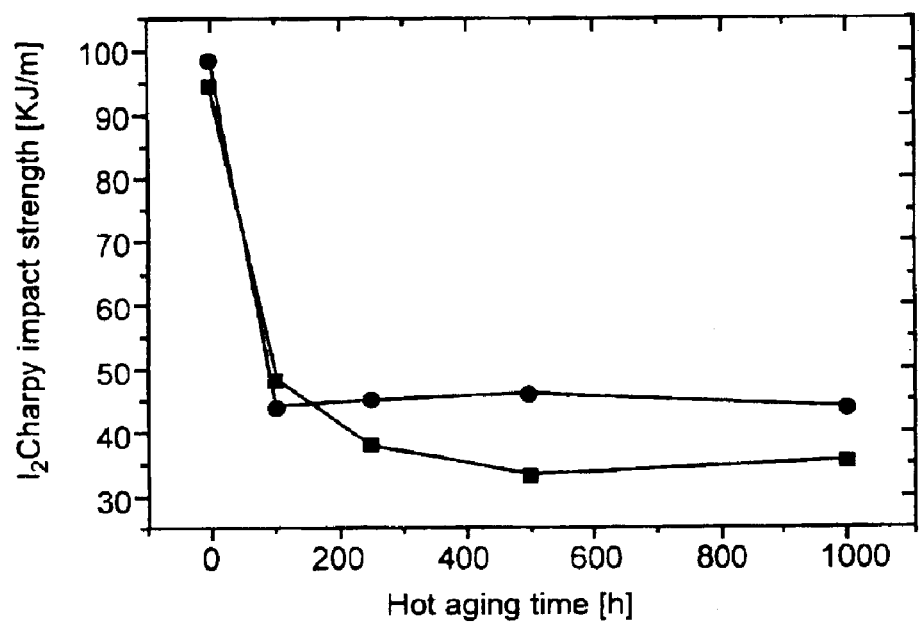

It is clear from FIG. 2 that the polymer prepared according to comparative example 1 exhibits a larger change in the Charpy impact strength than that obtained according to inventive example 1.

Moreover, the polymer prepared according to comparative example 1 has a lower Charpy impact strength than that obtained according to inventive example 1.

We claim:

1. A process for preparing polyamides, which comprises polymerizing starting monomers selected from the group consisting of: lactams, omega-aminocarboxylic acids, omega-amino-carboxamides, omega-aminocarboxylate salts, omega-aminocarboxylate esters, equimolar mixtures of diamines and dicarboxylic acids, dicarboxylic acid/diamine salts and mixtures thereof, in the presence of from 2.3 to 10 mmol, based on 1 mol of carboxamide group of the polyamide, of a chain regulator containing a nitrile group and an amino or an acid group capable of forming a carboxamide group.

2. A process as claimed in claim 1, wherein said chain regulator is an aminonitrile.

3. Polyamide obtainable, especially obtained, by a process as claimed in claim 1.

4. Polyamide containing, chemically bonded to the polymer chain via a carboxamide group, in an amount in the range from 2.3 to 10 mmol, based on 1 mol of carboxamide groups of the polyamide, a compound containing a nitrile group and an amino or an acid group capable of forming a carboxamide group.

5. Filament, fiber, sheet or molding comprising, specifically consisting of, polyamide as claimed in claim 4.

6. A process as claimed in claim 1, wherein said chain regulator is a nitrilocarboxylic acid.

7. A process as claimed in claim 2, wherein the aminonitrile is an aromatic, arylaliphatic or aliphatic aminonitrile having from 2 to 20 carbon atoms.

8. A process as claimed in claim 2, wherein the aminonitrile is an aromatic, arylaliphatic or aliphatic aminonitrile having from 2 to 12 carbon atoms.

9. A process as claimed in claim 6, wherein the nitrilocarboxylic acid is an aromatic, arylaliphatic or aliphatic nitrilocarboxylic acids having from 2 to 20 carbon atoms.

10. A process as claimed in claim 6, wherein the nitrilocarboxylic acid is an aromatic, arylaliphatic or aliphatic nitrilocarboxylic acids having from 2 to 12 carbon atoms.

11. A process as claimed in claim 1, wherein the chain regulator is employed in an amount of at least 2.4 mmol per 1 mol of carboxamide group of the polyamide.

12. A process as claimed in claim 1, wherein the chain regulator is employed in an amount of at least 2.8 mmol per 1 mol of carboxamide group of the polyamide.

13. A process as claimed in claim 1, wherein the chain regulator is employed in an amount of at most 6 mmol per 1 mol of carboxamide group of the polyamide.

14. A process as claimed in claim 1, wherein the chain regulator is employed in an amount of at most 4 mmol per 1 mol of carboxamide group of the polyamide.

15. A polyamide as claimed in claim 4, wherein the compound containing a nitrile group and an amino or an acid group is an aromatic, arylaliphatic or aliphatic aminonitrile having from 2 to 20 carbon atoms, or is an aromatic, arylaliphatic or aliphatic nitrilocarboxylic acids having from 2 to 20 carbon atoms.

16. A polyamide as claimed in claim 4, wherein the compound containing a nitrile group and an amino or an acid group is an aromatic, arylaliphatic or aliphatic aminonitrile having from 2 to 20 carbon atoms, or is an aromatic, arylaliphatic or aliphatic nitrilocarboxylic acids having from 2 to 12 carbon atoms.

17. A polyamide as claimed in claim 4, wherein the compound containing a nitrile group and an amino or an acid group is present in an amount of at least 2.4 mmol per 1 mol of carboxamide group of the polyamide.

18. A polyamide as claimed in claim 4, wherein the compound containing a nitrile group and an amino or an acid group is present in an amount of at least 2.8 mmol per 1 mol of carboxamide group of the polyamide.

19. A polyamide as claimed in claim 4, wherein the compound containing a nitrile group and an amino or an acid group is present in an amount of at most 6 mmol per 1 mol of carboxamide group of the polyamide.

20. A polyamide as claimed in claim 4, wherein the compound containing a nitrile group and an amino or an acid group is present in an amount of at most 4 mmol per 1 mol of carboxamide group of the polyamide.

* * * * *